United States Patent [19]

Hargrave et al.

[11] Patent Number: 4,646,342

[45] Date of Patent: Feb. 24, 1987

[54] TEST TRUNK ACCESS CONTROLLER

[75] Inventors: Franklin Hargrave, Newtown; David A. Zeller, Jr., Brookfield; Mark G. Smith, Naugatuck; William L. Hull, III, Southbury; Francisco A. Middleton, Newtown, all of Conn.

[73] Assignee: ITT Corporation, New York, N.Y.

[21] Appl. No.: 774,783

[22] Filed: Sep. 11, 1985

[51] Int. Cl.⁴ .............................................. H04Q 9/00
[52] U.S. Cl. ....................................... 379/24; 379/106
[58] Field of Search ................. 179/175.2 C, 175.2 R, 179/2 A, 2 AM

[56] References Cited

U.S. PATENT DOCUMENTS 3,899,639  8/1975  Cleveley et al. ................ 179/2 AM Primary Examiner—Stafford D. Schreyer
Attorney, Agent, or Firm—Peter C. Van Der Sluys; Robert A. Hays

[57] ABSTRACT

A test trunk access controller includes a test trunk interface controller accessed by a subscriber line assigned to a service provider, or other remote metering facility, and a test trunk interface device inter-connecting the test trunk controller with the test trunk device of a local telephone switch.

10 Claims, 4 Drawing Figures

TEST TRUNK ACCESS CONTROLLER

BACKGROUND OF THE INVENTION

The present invention generally relates to a test trunk access controller and, in particular, relates to such a test trunk access controller having means for accessing a first subscriber line by means of a test trunk device in response to a signal from a second subscriber line.

In general, in order to perform the necessary maintenance and testing of subscriber telephone lines, a telephone company has a test trunk device that is connected, at one side thereof, to a maintenance and test center and, at the other side thereof, is connected to subscriber lines by means of a local telephone switch in such a fashion that, when a subscriber line is accessed, the subset connected thereto does not ring. By use of such test trunk devices, any subscriber line interconnected to the local switch can be accessed or, in fact, subscriber lines remotely connected thereto via other switches. The local switch referred to above is usually a central office switch although, alternatively, it can also be a Private Branch Exchange (PBX).

More recently, various telemetry or remote metering systems have been advanced that take advantage of these test trunk devices. That is, equipment is connected to a test trunk device that, when activated by a local equipment operator, connects the equipment to a subscribers line in a non-ringing fashion. Such systems require a dedicated line between the test trunk device and the equipment. These requirements present a considerable drawback both in cost and capacity. These drawbacks become more of a problem if the equipment is physically located at, or near, the central office switch, since, in such a location, physical space is at a premium.

Consequently, in an effort to avoid the expense and other difficulties associated with conventional telemetry systems, such as remote metering systems, it is highly desireable to provide a test trunk access controller that interfaces with the test trunk device at the local telephone switch and, nevertheless, allows use thereof via a conventional subscriber line.

SUMMARY OF THE INVENTION

Accordingly, it is one object of the present invention to provide a test trunk access controller particularly adapted for use in a telemetry, or remote metering, system that overcomes the above recited drawbacks.

This object is accomplished, at least in part, by a test trunk access controller having means for accessing a first subscriber line by means of the test trunk device of a local switch in response to a signal from a second subscriber line.

Other objects and advantages will become apparent to those skilled in the art from the following detailed description read in conjunction with the appended claims and the drawings attached hereto.

DETAILED DESCRIPTION OF THE INVENTION

Figure 1:
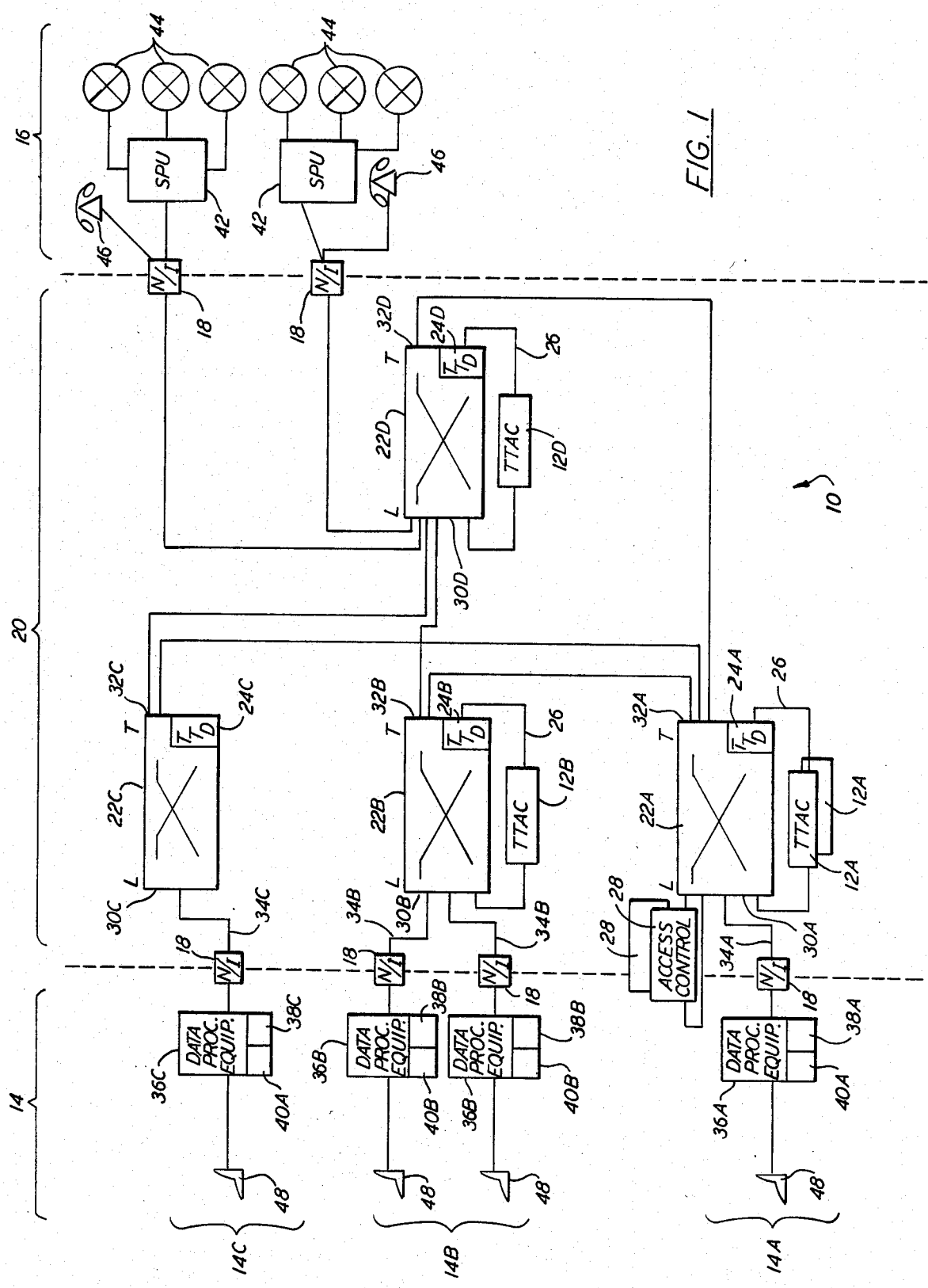
FIG. 1 is a block diagram of a remote metering system including a test trunk access controller embodying the principles of the present invention.

A remote meter reading system, generally indicated at 10 in FIG. 1, provides an exemplary environment wherein a test trunk access controller 12, embodying the principles of the present invention, can be used. As shown in FIG. 1, a number of different service providers 14, are adapted to access a desired set of subscriber locations 16 by means of conventional telecommunication network interfaces 18 of a telecommunication network 20.

A typical telemetry system is shown and described in U.S. patent application Ser. Nos. 648,542; 667,527; and 667,789 filed on Sept. 7, 1984, Nov. 2, 1984, and Nov. 2, 1984, respectively. These applications are assigned to the assignee hereof and deemed incorporated herein by reference.

In the system 10 shown in FIG. 1 the telecommunication network 20 includes a plurality of local switches 22A, B, C and D that, in most instances, are geographically separated. Each local switch 22A, B, C, and D includes a test trunk device 24 having, inter alia, multiple test trunk lines 26 accessible thereat. Normally, of these test trunk lines 26, two are reserved by the telephone company for telephone company business. In fact, most frequently, only one of the two reserved test trunk lines 26 is active while the second is used for redundancy in case of failure to the first. Although one could access a test trunk controller 12 directly, one or more of the local switches, for example, 22A may include one, or more network access controllers 28 that serve the network 20 as a service provider traffic routing center. As shown, each local switch 22 has a line side 30 and a trunk side 32. The line side 30 of each local switch 32 connects, via various network interfaces 18, to subscriber line 34 associated with that local switch 22. The trunk side 32 of the local switches 22 are connected to the trunk side 32 of the local switch 22A having the network access controller 28 associated therewith. Hence, all calls placed through any of the local switches 22 are routed via the network access controller 28 associated with the local switch 22A. Further, as more fully discussed hereinbelow, one or more of the local switches 22 includes a test trunk access controller 12 connected between one of the test trunk lines 26 of the local switch 22 and the line side 30 thereof.

In this particular system 10, each service provider 14 includes data processing equipment 36A, B and C that, for example, can be a computer adapted for the remote metering of the facilities provided by that particular service provider 14A, B or C. Naturally, a number of different service providers 14, for example, suppliers of water, gas or electricity, can be simultaneously provided with remote metering capabilities and, in fact, be independent. That is, each service provider 14A, B or C can be provided with a separate subscriber line 34A, B or C, respectively. The data processing equipment 36A, B and C are, preferably, adapted to signal, or initiate, a telephone call via a meter reading front end system 38A, B and C, respectively, (MRFES) that includes, for example, a look-up table matching an account number to a telephone number and, preferably, means for placing a conventional telephone call. In this manner each service provider 14 can be connected to any subscriber connected to access controller 28 associated with the local telephone network 20.

Preferably, each service provider data processing equipment 36 additionally includes a meter reading field installation and testing system (MRFITS) 40A, B and C communicating with a meter reading system center, not shown in the drawing, via the MRFES 38A, B and C, respectively, and the access controller 28.

In one implementation, such as system 10, each subscriber location 16 is provided with a subscriber premises unit (SPU) 42 that interfaces with a plurality of meter encoders 44 located on the premises of the subscriber. One particular subscriber premises unit (SPU) 42 is fully discussed and described in U.S. patent application Ser. No. 774,780 entitled INFORMATION COLLECTING AND FORWARDING APPARATUS filed on even date herewith and assigned to the assignee hereof. This application is deemed incorporated herein by reference.

As described in the above-referenced patent application, upon receipt of a proper carrier signal from the data processing equipment 36 of a service provider 14, the subscriber premise unit 42 is activated and powers a meter encoder 44 to collect information therefrom. The information is subsequently forwarded to the data processing equipment 36 of the service provider 14.

In the preferred system 10, the subscriber premise unit 42 is accessed via the same subscriber line that connects to the telephone subset 46 located at that premises.

In operation, each service provider 14 can provide a human interface, such as a terminal 48, for handling unscheduled meter readings to, for example, check the validity of an alarm signal from a SPU 42, to verify a meter reading or billing error, or similar situations. Ordinarily, however, scheduled meter reading will be handled automatically via the data processing equipment 36. Further, each local switch 22 is not necessarily required to have an access controller 28 associated therewith. That is, so long as there is an access controller 28 in the network path between a particular service provider, for example, 14C, and a subscriber premise unit 42, the remote metering can be performed. For example, a geographically remote service provider 14C in one state can, via a local switch 22A in another state, access a subscriber premise unit 42 in the first state using the access controller 28, and the test trunk access controller 12D of the local switch 22D in the first state. For this purpose, as well as for heavy loading and/or redundancy, the local switch 22A could have more than one access controller 28 associated therewith. Furthermore, each local switch 22 could have more than one test trunk access controller 12 associated therewith.

Figure 2:
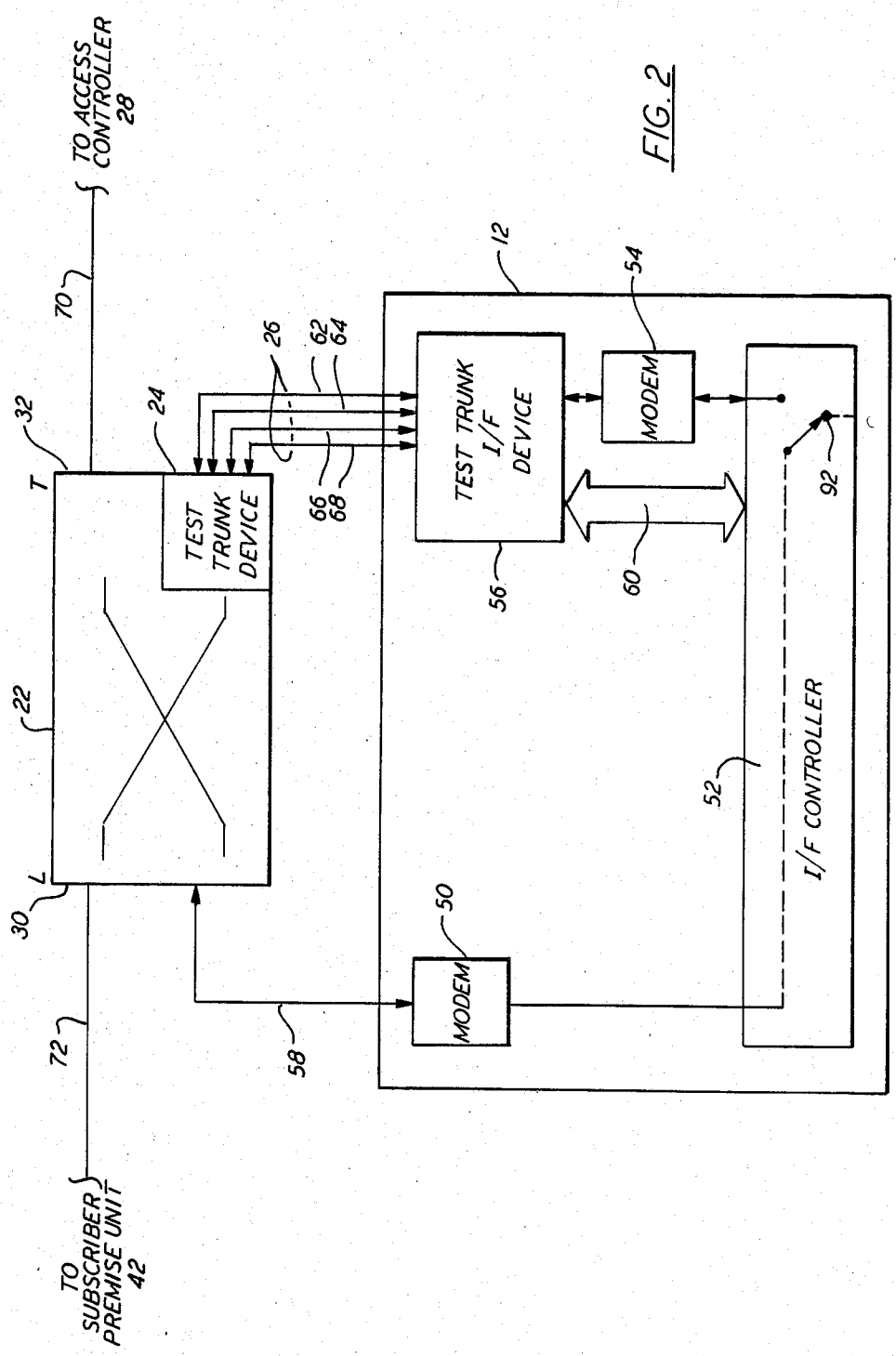
FIG. 2 is a block diagram of a typical central office switch configuration having a test trunk access controller connected thereto.

As shown in the block diagram of FIG. 2, a test trunk access controller 12, embodying the principles of the present invention, includes a first modem 50, a test trunk interface controller 52, a second modem 54 and a test trunk interface device 56. The first modem 50 is connected, between a conventional subscriber line 58, to the line side 30 of the local switch 22 and the interface controller 52. The controller 52 communicates with the test trunk interface device 56 via the data bus 60. The test trunk interface device 56 connects to the telephone company test trunk device 24 via a test trunk line 26 having four wires designated as tip 62, ring 64, sleeve 66 and ground 68.

As more fully discussed below, in operation, a call placed by a service provider 14 reaches the local switch 22 via the access controller 28 on a trunk line 70. The call is directed to the subciber line 58 associated with the test trunk access controller 12 associated with the local switch 22. After appropriate call execution procedures are carried out under directives from the test trunk interface controller 52, the call is completed, via the test trunk device 24 of the local switch 22, to a subscriber premise unit 42 via subscriber line 72

In one preferred embodiment, the test trunk interface controller 52 is the equivalent of a personal computer without a display or keyboard. The first and second modems, 50 and 54, respectively, are conventional devices, such as, for example, Smartmodem 1200B manufactured and marketed by Hayes Microcomputer products Inc. of Norcross, Ga.

Figure 3:
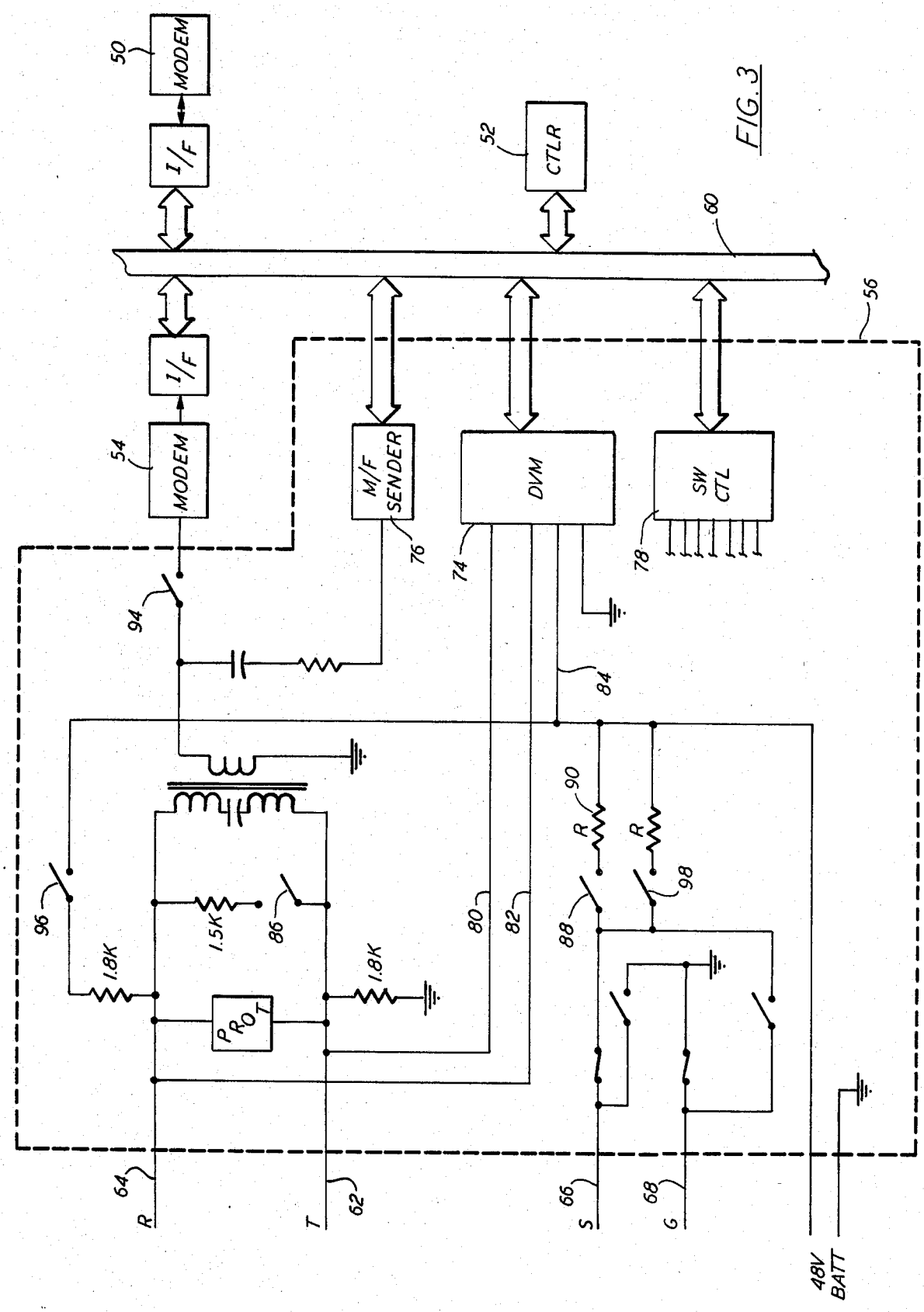
FIG. 3 is a block diagram of a test trunk interface device useful in the test trunk access controller shown in FIGS. 1 and 2.

A typical test trunk interface device 56 is shown in the block diagram of FIG. 3, and includes a digital volt meter 74, a multifrequency tone sender 76 and means 78 for controlling a plurality of switches.

The digital volt meter 74 includes two leads, 80 and 82 connected to the tip 62 and ring 64 wires of the test trunk line 26. The digital volt meter 74 also includes a third lead 84 that monitors the battery voltage applied to the ring 64 wire. By these connections the digital volt meter 74 is adapted to monitor the status of the call progress to the subscriber line 72.

The multifrequency tone sender 76 is adapted to provide conventional trunk multifrequency signals to cause the test trunk 26 to be connected to a particular telephone call over the subscriber line 72. The sender 76 can be implemented using circuitry known in the telephony art.

Figure 4:
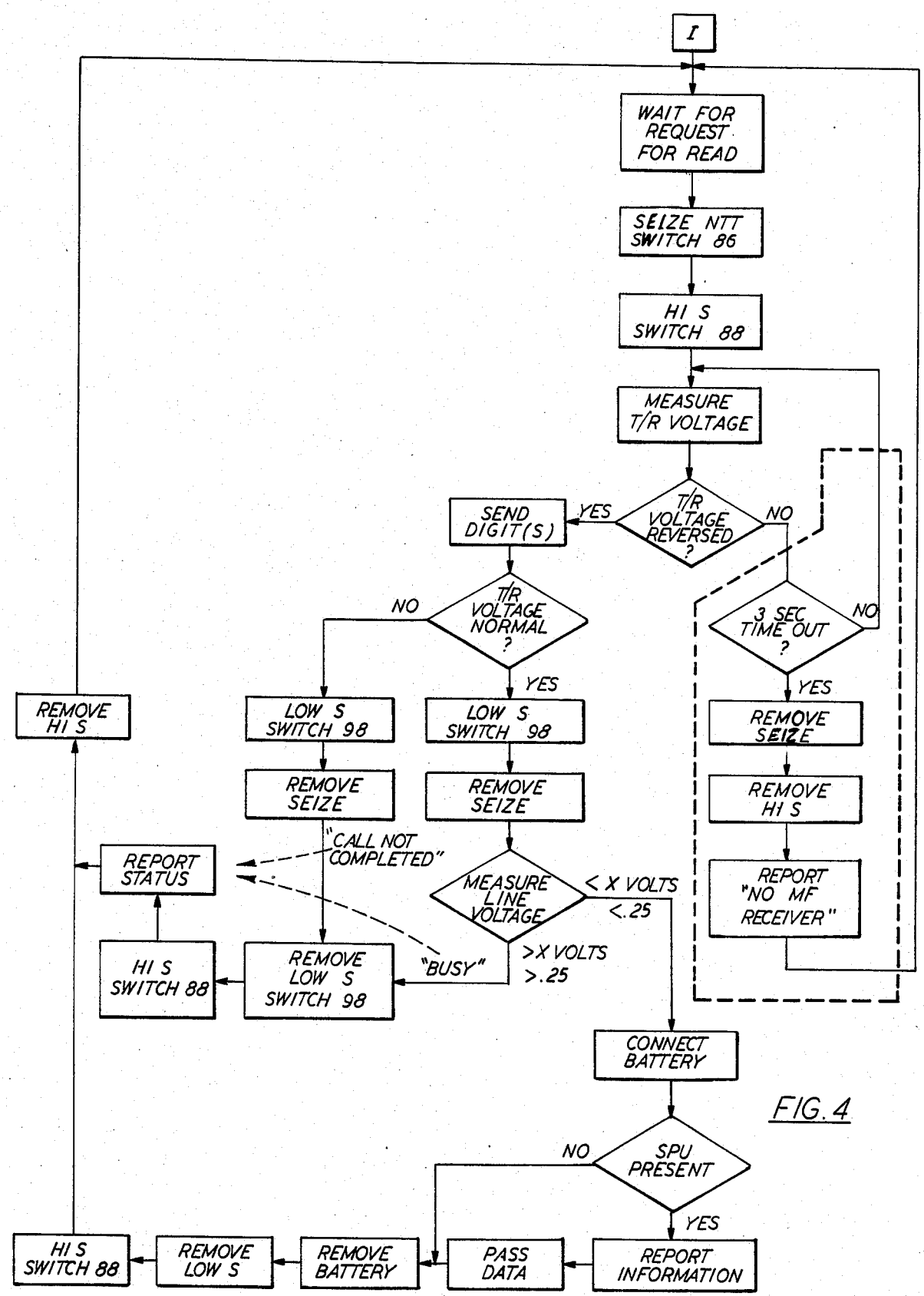
FIG. 4 is a flow diagram of a test trunk access control procedure.

The switch controller 78 includes the hardware necessary for opening and closing various switches during the call progression. For example, if the switches are relays the switch controller 78 would include the bus interface registers and relay drivers. The various switches are discussed hereinbelow with regard to the flow diagram of FIG. 4.

In one sequence of operation, a call placed by the service provider 14, via the data processing equipment 36 thereof, either automatically or by an operator at the terminal 48 associated therewith, is directed to the first modem 50 as if the telephone call were a conventional call. The test trunk interface controller 52 may verify the identity of the caller either by receiving a coded message from the service provider 14 or by, once activated, hanging up and dialing back the service provider 14. This prevents external interference and tampering with the operation of the service provider 14. The test trunk interface controller 52, if not already performed by the access controller 28, then translates the information received from the service provider 14 into the normalized office code of the subset 46 at the subscriber location 16 that is to be remotely metered.

The controller indicates to the test trunk interface device 56 to go off-hook at the test trunk device 24. This is effected by directing the switch controller 78 to close switch 86 and switch 88. The closing of switch 86 causes the tip 62 and ring 64 wires to be seized. The closing of switch 88 causes a −48 volts to be placed across the 1 K ohm resistor 90 through the test trunk device 24 to ground. The test trunk device 24 then signals the test trunk interface device 56 that a signaling receiver is attached. This is done by reversing the voltage polarity provided by the test trunk device 24 and is sensed by digital volt meter 74. The interface controller 52 then outputs the normalized office code and subscriber line number via the multifrequency sender 76. The test trunk device 24 sets the test trunk line 26 back to normal polarity following acceptance of the last digit of the dialing sequence. The interface controller 52 then causes a "cut through" from the test trunk line 26 to subscriber line 72 by causing switch 98 to close and switch 88 to open thus reducing the current in sleeve lead 66 to the test trunk device 24. Once the connection is made to the test trunk device 24 the test trunk interface device 56 then measures the voltage on that line to ascertain the condition of the subscriber's line 72. If the subscriber is on-hook, the information is passed to the interface controller 52 that causes a switch 92, shown in FIG. 2, i.e., a virtual switch, to be closed. To effect the connection to the subscriber line 72 the switch 86 is opened and switches 94 and 96 are closed.

Digital volt meter 72 then measures the voltage on subscriber line 72 via test trunk line 26 tip and ring wires 62, and 64, respectively. The measurement is passed to the interface controller 52 where a determination is made if subscriber premise equipment 42 is connected or not. If no equipment is present on the subscriber line 72, the controller 52 will disconnect from the test trunk device 24 and signal the access controller 28. If subscriber premise equipment 42 is present, the controller 52 sends a message to the access controller 28 and provides a clear communication path from line 70 to subscriber line 72. The information is forwarded directly, by virtue of closing switch 92 to the data processing equipment 36 of the service provider 14. That is, the actual transfer of information between the service provider 14 and the subscriber premise unit 42 is executed via the data ports of the interface controller 52.

Upon completion of data transmission, the access controller 28 sends a message to the test trunk interface controller 52 causing the test trunk access controller 12 to diconnect from the test trunk device 24 and return all switches to their initial state.

If the subset of the subscriber to be metered is off-hook, the test trunk access controller 12 sends a busy message to the access controller 28 that, effectively, signals the busy condition to the data processing equipment 36 of the service provider 14. The data processing equipment 36 is adapted, by means known in the art, to recognize such a busy condition and upon receiving same, determines when and if the reading of the meter associated with that particular subscriber is again attempted.

Preferably, a watch-dog timer is provided within the interface controller 52. The timer, after a particular predetermined time period, for example, 3 seconds, subsequent to the connection between the test trunk device 24 and the subscriber line 72 causes a message to be sent toward the access controller 28 if no data has been received from the called subscriber. This message is then provided, via the first modem 50, to the data processing equipment 36 of the service provider 14.

Similarly, a watch-dog timer is provided to monitor activity on the subscriber line 58. If activity is not detected, for example, after 30 seconds, the test trunk access controller will return to idle state.

Although the present device has been described with regard to a specific embodiment it will be understood that other arrangements or configurations may be made that, nevertheless, do not depart from the spirit and scope of the present invention. Hence, the present invention is deemed limited only by the appended claims and the reasonable interpretation thereof.

What is claimed is:

1. A test trunk access controller comprises:
   means for accessing a first subscriber line via a test trunk device in response to a signal from a second subscriber line said means including a test trunk interface device, said test trunk interface device being connected to said test trunk device via a test trunk line, said test trunk line including tip, ring, sleeve and ground wires;
   a first modem, said first modem being connected to said second subscriber line; and
   a test trunk interface controller, said test trunk interface controller being connected to said first modem and to said test trunk interface device.

2. Controller as claimed in claim 1 wherein said test trunk interface device further comprises:
   means for monitoring the voltage between said tip and ring wires of said test trunk line.

3. Controller as claimed in claim 2 wherein said voltage monitoring means includes a digital volt meter.

4. Controller as claimed in claim 2 wherein said test trunk interface device further comprises:
   means for impressing signals on said tip and ring wires whereby a subscriber location can be called.

5. Controller as claimed in claim 1 further comprising:
   a second modem, said second modem being connected between said test trunk interface device and said test trunk interface controller.

6. Controller as claimed in claim 5 further comprising:
   means, responsive to a signal from said second subscriber line, for seizing said test trunk line.

7. Controller as claimed in claim 6 further comprising:
   means, responsive to a signal from said test trunk interface controller, for connecting a multifrequency sender to said seized test trunk line whereby said first subscriber line can be accessed.

8. Controller as claimed in claim 7 further comprising:
   means for establishing a telephone connection across said first and said second subscriber lines communicating data therebetween.

9. Controller as claimed in claim 7 further comprising:
   means, within said test trunk interface device, connecting a source voltage on said first subscriber line.

10. Controller as claimed in claim 6 further comprising:
    means for detecting the status of a subscriber subset connected to said first subscriber line.

* * * * *